United States Patent Office 3,761,458
Patented Sept. 25, 1973

3,761,458
POLYMERIZATION PROCESS AND PRODUCTS
Howard V. Holler, Oakland, and Edward A. Youngman, Lafayette, Calif., assignors to Shell Oil Company, New York, N.Y.
No Drawing. Continuation of abandoned application Ser. No. 444,445, Mar. 31, 1965. This application Oct. 3, 1969, Ser. No. 866,423
Int. Cl. C08f 3/00, 3/84, 15/00
U.S. Cl. 260—89.7 N     4 Claims

ABSTRACT OF THE DISCLOSURE

Methods are disclosed for homopolymerization of a large variety of polar-substituted alpha-monoolefins and for the random copolymerization and block copolymerization of polar-substituted alpha monoolefin with alpha monoolefin hydrocarbons.

---

This application is a continuation of Ser. No. 444,445 filed Mar. 31, 1965, now abandoned.

This invention is directed to the addition polymerization of alpha-olefins which bear a polar group. Polar groups, broadly, are groups containing atoms able to donate electron pairs in a chemical reaction.

Stereoregular polymerization of terminally unsaturated olefinic hydrocarbons by means of Ziegler-type coordination catalysts has become a widely practiced commercial process, particularly in the production of polyethylene and polypropylene. Random copolymerization of terminally unsaturated olefinic hydrocarbons for production of rubbery linear copolymers is also practiced with Ziegler-type coordination catalysts.

Linear polyolefin hydrocarbons have numerous highly advantageous properties, but they are handicapped for some uses by their relative chemical inertness which is due to the absence of polar groups from the molecules. The lack of polar groups in these polyolefins renders them hard to dye and can adversely affect other properties such as adhesive properties and, in the case of rubbery polymers, their vulcanizability. Many methods for overcoming such deficiencies have been suggested but none found universal acceptance.

This invention provides a widely applicable means for producing stereoregular polymers of enhanced reactivity from alpha-olefins which bear polar groups. This invention also provides a method for producing linear polymers having a wide range and content of polar groups.

This invention is concerned with the polymerization of monomers which have a terminal ethylenic double bond, separated by at least one carbon atom from a polar group. Much preferred are those monomers in which the vinyl group and the polar group are separated by several carbon atoms.

The prior art contains references to the use of small amounts of non-olefinic polar materials, such as ethers and amines, to improve the stereoregulating ability of Ziegler-type coordination catalysts. The presence of large amounts of such polar materials in the polymerization media was generally found to be inhibitory and for this reason it was assumed that olefins bearing polar groups of the type mentioned above could not be polymerized satisfactorily with such coordination catalysts.

It has been found, in accordance with this invention, that certain olefinic polar compounds which have heretofore been considered unsuitable for use in stereoregular polymerization can be employed to produce stereoregular homopolymers, and random or block copolymers with terminally unsaturated olefinic hydrocarbons. Particularly advantageous are block copolymers containing large blocks of stereoregular hydrocarbon homopolymer and small blocks of polymer of polar compounds.

This invention is based on systematic relationships discovered in a detailed study of the polymerization of a number of different polar compounds by contact with Ziegler-type coordination catalysts under a variety of conditions. Among the pertinent findings upon which this invention is based are the following:

The degree to which polar compounds react with and generally deactivate Ziegler-type coordination catalysts depends on the structure of the polar compound and the constitution of the catalyst. Certain polar compounds or groups are highly reactive and deactivating whereas others are less so. Both steric and electronic effects are important in determining the mode of action of a polar compound or group. Terminal olefins bearing reactive polar groups can be polymerized in a stereoregular fashion provided sufficient relative amounts of the catalyst components are supplied. For the most reactive polar olefins of this type a molar excess of organometallic reducing compound over polar olefin is generally necessary to maintain an active polymerization catalyst. Other terminal olefins bearing less reactive polar groups require lesser relative amounts of catalyst components, particularly the organometallic reducing compound, in order to maintain satisfactory polymerization activity. Certain polar groups were found to be essentially non-reactive with catalyst components; terminal olefins bearing these can be polymerized with Ziegler-type coordination catalysts similar to those used with strictly hydrocarbon olefins.

The primary reaction of polar groups which contain atoms able to donate electron pairs (i.e., bases in the Lewis sense), with catalyst components, which generally are able to accept electron pairs (i.e., Lewis acids), is that of coordination. The degree to which any polar group coordinates with catalyst components depends upon the steric hindrance surrounding the donor atom as well as ability of groups attached to it to withdraw or supply electrons. A polar group in which the donor atom is surrounded by bulky groups and/or electron-depleting groups will coordinate poorly with Ziegler-type catalyst components and will not deactive the latter by coordination. Conversely a polar group with a poorly shielded donor atom of high electron density will coordinate well with catalyst components and will thus deactivate them. To maintain catalyst activity in the presence of these latter, poorly tolerated polar groups, greater relative amounts of catalyst components, particularly the organometallic reducing compound, must be employed, than are required in polymerization of non-polar olefins.

Polar groups with acidic protons (active hydrogen) undergo another important reaction with Ziegler-type catalyst components. This reaction, unlike simple coordination, does not involve a simple mobile equilibrium and the reactants themselves are chemically altered. Following this type of reaction a type of polar group different from that originally introduced may be present in the polymerization media. Terminal olefins bearing this class of polar group can still be polymerized, provided sufficient relative amounts of catalyst components are employed.

Polar compounds in which the terminal vinyl and polar groups are directly attached to each other are not suitable for polymerization according to this invention. Such monomers often polymerize preferentially by conventional cationic or anionic routes rather than the desired anionic coordination (Ziegler) route. Monomers in which the terminal ethylenic bond and the polar group are separated by only one carbon atom are of little practical utility in the processes of this invention because these monomers may be susceptible to cleavage by Ziegler-type catalyst components. Also, the close proximity of the polar group, particularly when coordinated with catalyst components, to the vinyl group to be polymerized may sterically hinder the latter to drastically reduce its rate of polymerization.

For use in this invention, the vinyl group to be polymerized should therefore be separated from the polar group by a linear series of carbon atoms, such as a polymethylene chain, and/or by a saturated or aromatic ring structure. The separation is preferably equivalent to at least two carbon atoms. The separating groups may also contain, instead of or in addition to carbon atoms, metal or metalloid atoms, such as silicon, which lack appreciable electron donor properties and are not readily cleaved under polymerization conditions.

Terminal olefins containing several polar groups can be used in this invention, though the polar groups themselves should be similarly separated from one another to reduce chelation and allow more facile polymerization.

It has also been found that use of certain polar groups which require a large excess of organometallic reducing compound and which are therefore not attractive for commercial utilization can be avoided in many cases. This is done by producing, instead, a polymer or copolymer of a polar compound which is less highly reactive with organometallic compounds, and converting the resulting polymer or copolymer, in a second reaction stage, to a polymer or copolymer in which the highly reactive polar group is present.

UTILITY AND PROPERTIES OF POLYMERS WHICH CONTAIN POLAR GROUPS

The homopolymers and copolymers produced according to this invention vary widely in physical and chemical properties, depending on the polar groups employed, the ratio of polar compound to hydrocarbon compound in the product, and the relative arrangement of polar compound and hydrocarbon units in the polymer chains.

One great area of utility of the products of this invention consists in providing readily controllable degrees of dyeability in polymers which are predominantly polymers of olefinic hydrocarbons. Dyeability has been demonstrated in homopolymers of polar olefins, random copolymers of polar olefins and olefinic hydrocarbons, and block copolymers of polar olefins and olefinic hydrocarbons, all produced according to this invention.

The utility of crystalline stereoregular polyolefin hydrocarbons and of random copolymers of olefinic hydrocarbons have been well established and such compounds are in commercial use. Crystalline polyolefins are suitable for the production of numerous molded or extruded manufactured articles such as containers, packaging films, textile fibers, and the like, and random copolymers for use as rubbers, such as in tires. Block copolymers containing small blocks of a polar olefin polymer attached to hydrocarbon polyolefins are not significantly changed in physical properties from the corresponding hydrocarbon polymer and are therefore useful for all the same uses, in addition to having the characteristic of being dyeable or otherwise reactive by virtue of the presence of the polar group.

The random incorporation of polar olefins into rubbery hydrocarbon copolymers according to this invention provides a novel and improved method of cross-linking and vulcanization.

Homopolymers of polar olefins according to this invention or copolymers having a high concentration of polar olefin are particularly suitable as blending stocks for blending into other polymers such as, for example, stereoregular crystalline polyolefins, to introduce dyeability or other desirable reactivity.

It has been found that some of the polymers of this invention are particularly useful in lubricating oil compositions, where they provide dispersancy and inhibitor properties, and aid in lubricating at extreme pressures. Such compositions are claimed in co-pending patent application Ser. No. 371,105 of Holler and Lorensen, filed May 28, 1964. Other polymers of this invention are particularly advantageous as surface coatings and adhesives since the presence of polar groups causes excellent adherence of the coatings to substrates, such as metals.

The physical properties of polymers produced according to this invention vary, depending on the polar compound employed, the proportion thereof in the total polymer, and the method of preparation of the polymer, i.e., whether it is prepared by homopolymerization, random copolymerization or block copolymerization. The polymers may be oily liquids, glassy solids, rubbery solids or highly crystalline polymers which are similar in properties to polypropylene.

Random copolymers in which a polar compound is introduced together with olefinic hydrocarbons vary in properties from (1) essentially crystalline, when the feed consists of only a small amount of polar compound and a single olefin which forms crystalline polymer, to (2) rubbery copolymers, to (3) polymers having essentially the properties of homopolymers of the polar olefins, when only a small amount of the hydrocarbon olefin is present. The random copolymers in which the polar compound is present in small concentration are essentially like the corresponding hydrocarbon polymers except for the added beneficial properties of dyeability or other reactability.

MONOMERS

Hydrocarbons

Monoolefins suitable for use in copolymers according to this invention are any terminal monoolefin hydrocarbons which are otherwise employed in Ziegler-type polymerization. Broadly, any terminally unsaturated monoolefin hydrocarbon of from 2 to 30 carbon atoms per molecule is suitable. Higher olefins, e.g., of up to 50 or more carbon atoms per molecule, may sometimes be useful.

Particularly suitable for many uses is propylene. Others which result in linear or stereoregular polymers are ethylene, 1-butene, 1-hexene, 1-dodecene, 3-methyl-1-butene, 4-methyl-1-pentene, vinylcyclohexane, styrene and the like. Olefins for production of stereoregular polymers have the formula $CH_2=CH-CH_2-R$ where R is an alkyl group, including branched groups.

For some uses, such as the preparation of copolymers employed in the compositions of said application of Holler and Lorensen, the monoolefin hydrocarbons have at least six and up to 50 or more carbon atoms. Monomers such as hexene-1, octadecene-1, heptacontene-1, and the like, are suitable. Most prefer for said copolymers are alpha-monoolefins of from 10 to 30 carbon atoms per molecule.

Polar olefins

The polar olefins have a single olefinic double bond, i.e., a vinyl group, in terminal position of the molecule, and have one of certain polar groups separated by at least one carbon atom from said terminal vinyl group. They may be represented by the general formula $$CH_2=CH-X(Z)_n \qquad (1)$$

where X represents a non-reactive group, i.e., a group which is non-reactive under Ziegler polymerization conditions, Z represents a polar group, and $n$ is an integer (excluding $n=0$), provided that the distance separating $CH_2=CH-$ and Z is at least equivalent to that provided by an intervening methylene group and preferably by at least a trimethylene group. When $n$ is 2 or more, the groups Z may be identical to each other or different. Group X is generally free of olefinic or acetylenic unsaturation, although isolated internal unsaturation may be present. For most practical purposes $n=1$ and Formula 1 becomes $$CH_2=CH-X-Z \qquad (2)$$

The non-reactive group X is preferably a polymethylene group $-(CH_2)_m-$ wherein $m$ is preferably between 3 and 10. However, useful results can sometimes be obtained when $m=2$ or even 1, and in some cases when it is greater than 10 and up to 30.

The non-reactive group X may also be a hydrocarbon group other than a polymethylene group, including other aliphatic groups and cyclic-(cycloaliphatic and aromatic) groups, and non-reactive organic groups which contain one or more hetero-atoms. For example, X may represent a branched alkyl group, an alkyl group bearing one or more cyclic substituents, a cyclic group, or a cyclic group bearing one or more aliphatic or cyclic substituents. Group X may be polyvalent and may bear more than one polar group Z. Useful groups X may also have one or more carbon atoms replaced by silicon, such as in silicoalkyl groups, e.g., —$CH_2CH_2Si(CH_2)_3CH_2CH_2$—.

Groups X and Z may be part of a single ring system or of attached ring systems in heterocyclic alkyl or aromatic groups.

The terminal olefins which bear polar groups and which are suitable for use in this invention accordingly include polar-substituted normal or branched chain alpha-olefins, polar-substituted 1-alkenyl alicyclic or aromatic compounds, and 1-alkenyl heterocyclic compounds. The polar substituent or substituents in the 1-alkenyl alicyclic or aromatic monomers may be attached through a side chain on the ring also.

Major groups of polar olefins, classified by generic formulas of compounds

The major groups of these compounds are represented by the following generic formulas:

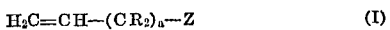 (I)

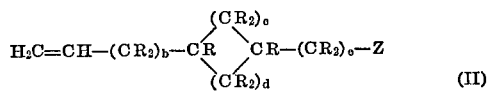 (II)

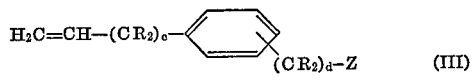 (III)

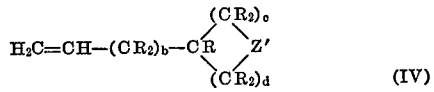 (IV)

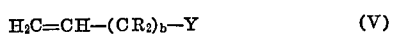 (V)

In these formulas, Z represents a univalent polar radical of the type enumerated below and Z' represents a divalent polar radical of the type enumerated below; Y is a heteroaromatic nucleus, e.g., pyridyl, thienyl and the like; $a$ is an integer greater than 0 and preferably greater than 1; $b$ and $e$ are integers equal to or greater than 0; $c$ and $d$ are integers whose sum is greater than 1; and R represents hydrogen alkyl or aryl groups. The only restriction on the latter generalization is that at least one of the substituents on the carbon atom attached to the vinyl group should be hydrogen, because when this atom is triply substituted with groups other than hydrogen the polymerization rate of the olefin is prohibitively slow due to steric hindrance to the vinyl group.

Most preferred for most purposes are Compounds I in which R represents hydrogen and $a$ is an integer from 3 to 18, i.e., omega-Z-substituted 1-alkenes having from 5 to 20 carbon atoms in the alkenyl group.

Polar groups classified by catalyst tolerance

Polar radicals which may be present in the monomer of this invention can be grouped into two general classes, namely, those which are well tolerated by Ziegler catalysts, herein designated "Class T" and those which are only moderately well tolerated or relatively poor tolerated, herein designated "Class NT."

Representative polar groups

The polar groups Z which are present in the polar olefins employed in this invention contain at least one atom of an element from Groups 5a and 6a of the Mendeleeff Periodic Table of the Elements (as illustrated on pp. 448 and 449, "Handbook of Chemistry and Physics," The Chemical Rubber Publishing Corp., 44th edition, 1962) preferably nitrogen or phosphorus from Group 5a, or oxygen or sulfur from Group 6a. Compounds of arsenic, antimony or bismuth, and of selenium or tellurium may be selected for special purposes. The polar compounds can be arranged according to the non-metal elements present in the polar groups.

In the following illustrative examples, R represents a member from the group consisting of H and R'; R' represents a hydrocarbon radical from the group consisting of alkyl, alkenyl, aryl, cycloalkyl, cycloalkenyl, and hydrocarbon radicals of these groups which contain hydrocarbon constituents from the same group, such as alkyl-substituted aryl radicals and the like, and identical radicals in which one or more H-atoms are replaced by a relatively inert non-hydrocarbon substituent, such as halogens; and X represents a chalcogen element, specifically oxygen and sulfur.

Polar groups representative of these classes and subclasses are illustrated in the following paragraphs.

(1) Amino type: The generic representation is —$NR_2'$ and >NR'. This generic group includes heterocyclic amines, such as pyridyl compounds. Representative radicals of Class T, the well-tolerated class, are methylphenylamino, diphenylamino, ethyl-1-naphthylamino, and bistrifluoromethylamino. Representative of Class NT, less well tolerated, are: diisopropylamino, dibenzylamino, dimethallylamino, and 2,6-dimethylpyridyl; still less well tolerated, as a rule, are the following groups: amino (—$NH_2$), anilino, dimethylamino, dialkylamino, and dodecylethylamino.

(2) The cyano group is represented by the single radical —CN, which is relatively poorly tolerated.

(3) Phosphino type: The generic representations are —$PR_2'$ and >PR'. Representative radicals for Class T, the well-tolerated class, are diphenylphosphino, ethylnaphthylphosphino, and bistrifluoromethylphosphino. Representative of Class NT, less well tolerated, are di-sec-butylphosphino and dibenzylphosphino; a representative relatively poorly tolerated group is di-n-butylphosphino.

(4) (Hydrocarb)oxy groups: The generic representation is —OR'. Representative of Class T are phenoxy, p-chlorophenoxy, and trifluoromethoxy. Representative of Class NT are neopentoxy and, still more poorly poorly tolerated, methoxy and allyloxy.

(5) Metal- and metalloid-containing groups: Groups having the formulas —$OM(R')_f$, —$OM(OR')_f$,

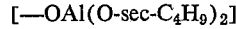

as well as metal salts of acidic groups, such as —$CO_2H$, —$SO_3H$, —PO(OR)OH and the like; where M is a metal or metalloid element and $f+1=g=$ the oxidation state of the element. Analogs of these groups may also be employed. Representative groups of this type in Class T are trimethylsiloxy and triphenylsiloxy. Most of these groups [—$OB(O-n-C_4H_9)_2$], di-sec-butyl-aluminate

[—$OAl(O-sec-C_4H_9)_2$]

lithium carboxylate [—COOLi] and sodium xanthate [—OCSSNa] groups.

(6) Carbonyl groups and their thio-analogs

R' represents a hydrocarbon group. These groups are relatively poorly tolerated. Representative are acetyl and benzoyl.

(7) Carbo(hydrocarb)oxy and hydrocarbcarboxyloxy groups and their thio-analogs

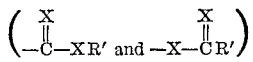

These relatively poorly tolerated groups are represented by carbomethoxy and benzoxy.

(8) Hydrocarbylsulfide groups: The generic formula is —SR'. Class T members are illustrated by thiophenoxy and trifluoromethylmercapto. Class NT includes moderately well-tolerated groups, such as n-butylmercapto and benzylmercapto, and poorly tolerated groups such as methylmercapto.

(9) Hydrocarbylpolysulfide groups (—$S_xR'$): These are poorly tolerated. They are represented by the tert-butyl-tetrathio group.

(10) (Hydrocarbyl)carbamyl groups and amido groups and their thio-analogs (—$CXNR_2'$ and —NR'CXR'): These are relatively poorly tolerated. Representative groups are diethylcarbamyl, phenylcarbamyl, diphenylcarbamyl, dicyclohexylthiocarbamyl and N-benzylphenylamido.

(11) Phosphono [—$PO(OR')_2$] and phosphinico

[—PO(OR')R']

groups and their thio-analogs: These are illustrated by the relatively poorly tolerated groups dimethylphosphono, n-butylphenylphosphino and diethyltrithiophosphono.

(12) Hydrocarbylsulfinyl and -sulfonyl groups (—SOR' and —$SO_2R'$): These are illustrated by a relatively poorly tolerated group, phenylsulfinyl, n-butylsulfonyl and phenylsulfonyl.

(13) Hydrocarbylsulfamyl groups (—$SO_2NR_2'$): These are illustrated by relatively poorly tolerated groups, dimethylsulfamyl and phenylsulfamyl.

Representative polar compounds

Following are illustrative examples of complete compounds which contain groups of the type enumerated above and which can be used in this invention. "Radical Class T" and "Radical Class NT" herein will refer to the well-tolerated and to the less well and poorly tolerated groups, respectively, as employed in the presentation of representative radicals. Compound Classes I, II, III, IV or V will refer to the generic formulas of compounds illustrated previously.

(1) Amino groups:
  Radical Class T—
    Compound Class I—N-(2-naphthyl)N-phenyl-10-undecenylamine; N,N-diphenyl-17-octadecenylamine; 3-diphenylaminomethylbutene-1.

The following compounds are all in radical Class NT, but in different compound classes:

Compound Class I—N,N-dibenzyl-9-decenylamine; N,N-diethyl-10-undecenylamine; N-phenyl - 10 - undecenylamine; 9 - decenylamine; N,N-dimethyl-10-undecenylamine;
Compound Class II—1-diethylamino-3-vinylcyclobutane;
Compound Class III—4-allyl-N,N-dimethylaniline;
Compound Class IV—N - methyl - 2 - methyl-5-vinylpiperidine;
Compound Class V—3-but-3-enylpyridine; 5-vinylquinaldine; 4 - (11-dodecenyl)pyridine; 3-but-3-enylpyridine.

(2) Cyano group:
  Radical Class NT—
    Compound Group I—6-cyano-4,4-dimethyl-1-hexene
(3) Phosphino group:
  Radical Class T—
    Compound Group I—diphenyl - 10 - undecenylphosphine
    Compound Group III—1-allyl-4-diphenylphosphino-naphthalene
    Compound Group IV—3-allyl-p-phenylphospholane Radical Class NT—
  Compound Group I—di-n-butyl-4-pentenylphosphine
(4) (Hydrocarb)oxy groups:
  Radical Class T—
    Compound Class I—7-phenoxy-1-heptene
    Compound Class II—1-allyl-3-phenoxymethylcyclopentane
    Compound Class III—4-(2-phenoxyethyl)styrene
    Compound Class V—2-(5-hexenyl)-5-methylfuran
  Radical Class NT—
    Compound Class I—8-n-butoxyoctene-1
    Compound Class IV—3(but-3-enyl)tetrahydrofuran
(5) Metal- and metalloid-containing groups:
  Radical Class T—
    Compound Class I—5-benzyl-5-trimethylsiloxy-1-heptene
  Radical Class NT—
    Compound Class I—aluminum-tris-10-undecenoxide; aluminum-tris-10-undecenoate
(6) Carbonyl groups and their thio-analogs:
  These compounds generally fall in Radical Class NT.
    Compound Class I—5-hexene-2-one
    Compound Class IV—2-allylcyclohexanone
(7) Carbo(hydrocarb)oxy groups and hydrocarbcarboxyloxy groups:
  These compounds generally fall in Radical Class NT.
    Compound Class I—n-butyl-10-undecenoate
    Compound Class II—1-(3-butenyl)-4-(4 - carboxymethoxybutyl)-cyclohexane
    Compound Class III—methyl - 4 - vinylphenylacetate
(8) Hydrocarbylsulfide groups:
  Radical Class T—
    Compound Class I—4-phenylmercapto-1-butene
    Compound Class II—2-allyl-1-methylmercapto-1-phenylcyclohexane
    Compound Class V—3-allylthiophene
(9) Hydrocarbylpolysulfide groups:
  Radical Class NT—
    Compound Class I—3 - butenylmethyltetrasulfide
(10) (Hydrocarbyl)carbamyl and amido groups and their thio-analogs:
  Radical Class NT—
    Compound Class I—N,N-diphenyl-10-undecenamide
(11) Phosphono and phosphinico groups and their thio-analogs:
  Radical Class NT—
    Compound Class I—dimethyl-10-undecenylphosphonate
(12) Hydrocarbylsulfinyl and -sulfonyl groups:
  Radical Class NT—
    Compound Class I—4-pentenylphenylsulfoxide
    Compound Class V—methyl(1-phenyl-3-butenyl)sulfone.

The illustrated polar radicals and compounds are familiar to organic chemists. No useful purpose would be served by further multiplying illustrative species.

POLYMERS

The homopolymers of polar compounds, produced according to this invention, are produced as substantially linear polymers having, in general, a weight average molecular weight in the range from about 10,000 to a million.

Homopolymers of compounds having the generic formula $CH_2=CH—X—Z_n$ can be represented by

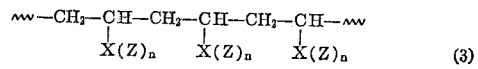

(3)

or by $-\{CH_2-CH[X(Z)_n]\}_m-$, where $m$ is at least about 100. The wavy lines in Formula 3 symbolize repetition of the same units. Terminal groups are generally not significant in determining properties of these polymers.

Random copolymers of compounds having the generic formula $CH_2=CH-X(Z)_n$ and an alpha-monoolefin hydrocarbon $CH_2=CHR$, where R is hydrogen or a saturated hydrocarbon group, are typified by the following molecular arrangements, where $a$ is $-CH_2-CH(R)-$ and $b$ is $-CH_2CH[X(Z)_n]-$:

$$-aabbabbaaaabbab- \quad (4)$$

represents a polymer in which the proportions of monomers are nearly equal, and $$-aaaaaabaabbaaaaaabbba- \quad (5)$$

one in which $a$ is present in substntial excess. In such random copolymers, uninterrupted sequences generally comprise from 1 to 100 monomer units.

The proportion of polar monomer units $b$ relative to hydrocarbon monomer units $a$ may vary widely, e.g., from 0.01 to 90 percent by weight, resulting in products which have properties similar to either homopolymer. Often the presence of a relatively small proportion, e.g., from 0.1 to 1 percent or up to 10 percent of polar monomer imparts valuable properties to the polymer, such as dyeability or other reactivity while permitting it to retain to a substantial extent the desired physical properties of the pure olefin homopolymer. Random copolymers with from 0.1 to 1% or from 1 to 10% of polar monomer units are thus especially useful for many purposes. For other purposes polar monomer units may be desired in concentrations above 10 percent, e.g., as much as 10 to 30 percent or more, to provide polymers having both modified physical and chemical properties. Random copolymers containing a major proportion by weight of polar monomer units are rarely desired.

Block copolymers of this invention can be represented by the following molecular arrangements (6) through (10), wherein $[A_p]$ is a homopolymer sequence of $p$ monomer units $a$, $[B_q]$ is a homopolymer sequence of $q$ monomer units $b$, and $[A_rB_s]$ is a random copolymer sequence of $r$ monomer units $a$ and $s$ monomer units $b$:

$$[A_p][B_q] \quad (6)$$

represents the preferred block copolymers of this invention, in which a single block of linear polar alpha olefin homopolymer is attached to a single block of linear alpha olefin hydrocarbon homopolymers.

Other block copolymers may be produced by repeatedly forming blocks $[A_p]$ and $[B_q]$ where $p$ and $q$ may vary. Typical is the polymer $$[A_{p1}][B_{q1}][A_{p2}][B_{q2}][A_{p3}][B_{q3}] \quad (7)$$

Other block polymers comprise block $[A_p]$ and blocks $[A_rB_s]$, such as $$[A_p][A_rB_s] \quad (8)$$

and $$[A_{p1}][A_{r1}B_{s1}][A_{p2}][A_{r2}B_{s2}][A_{p3}][A_{r3}B_{s3}] \quad (9)$$

The random copolymer sequences may have the same compositions as described above for random copolymers and the ratio of $r+s$ to $p$ may be similar to the ratio of $q$ to $p$, defined below. Blocks of different compositions may be connected by a block of random compositions, as in $$[A_p][A_rB_s][B_q] \quad (10)$$

Such polymers result when a monomer $b$ is introduced into a reaction mixture in which polymer $[A_{p1}]$ has been formed, and in which some unreacted monomer $a$ is still present.

The proportion of polar monomer in the total block copolymer is preferably in the same range as previously stated for the case of random copolymers. In the block polymers of this invention, the predominant segment usually is $[A_p]$. In polymers of Formulas 6 through 10, the ratios of $p:q$, $\Sigma p:\Sigma q$, $p:(r+s)$, $\Sigma p:\Sigma(r+s)$ and $p:q$, respectively, are preferably between 5:1 and 25:1, but may be as low as 1:1 in some cases and as high as 100:1 in others. In polymers such as (6), (8) and (10), block $[A_p]$ preferably contains at least about 200 molecules and preferably 1000 to 10,000 molecules; in multiblock polymers, such as (7) and (9), the number of molecules per block $[A_p:]$ may be from 20 to 200, and up to about 5000.

Variants of the described block copolymers will readily occur to the skilled polymerization chemist, and are within the scope of this invention.

CATALYSTS

A large number of polymerization catalysts based on transition metal compounds have been disclosed. A summary of the state of the art in 1959 with respect to those so-called Ziegler catalysts is found in "Linear and Stereoregular Addition Polymers" by Gaylord et al., Interscience Publishers, Inc., New York. With the qualifications hereafter set out, these catalysts are useful in the process of this invention.

One essential component of Ziegler-type catalyst compositions is the halide or alkoxyhalide of a transition metal selected from Groups 4b, 5b, 6b and 8 of the Periodic Table of the Elements. In the active catalyst the transition metal is at a valence below its maximum. Among the halogens the order of preference runs from chlorides to bromides to iodides to fluorides.

Titanium trichloride is particularly preferred and especially the gamma form thereof. With a highly effective aluminum alkyl, this leads to the most effective catalysts. An active form of titanium trichloride is prepared by reducing titanium tetrachloride by reaction with an aluminum trialkyl, as described, for example, in U.S. 2,971,925 to Winkler et al. Activated forms of alpha and gamma titanium trichloride are sometimes referred to as delta titanium trichloride. The delta form, as well as the beta form of titanium trichloride, are also suitable for use in the catalysts of this invention. These active forms of titanium trichloride generally may be considered as cocrystalline mixtures of $TiCl_3$ and $AlCl_3$ of varying compositions. Both the $\beta$-$TiCl_3$ and $\gamma$-$TiCl_3$ can be produced by reacting 1 mol of $TiCl_4$ with ⅓ mol of aluminum triethyl. Brown $\beta$-$TiCl_3$ results when the reaction is carried out at relatively low temperature, e.g., 25° C.; purple $\gamma$-$TiCl_3$ is produced at a higher temperature, e.g., 160° C. Both the brown and purple forms of $TiCl_3$ and methods for preparing them are well known to persons skilled in this art. Other catalytically active forms of $TiCl_3$ are commercially produced by reduction of $TiCl_4$ by means of aluminum metal, or with hydrogen, followed by an activating treatment.

Other suitable titanium compounds include butoxy titanium dichloride and ethoxy titanium dichloride.

Another preferred catalyst comprises the active form of vanadium trichloride.

Similar compounds of zirconium and other transition metals can be used, such as their trichlorides, tribromides, and alkoxy dichlorides.

The reducing component of the catalyst is an organometallic compound of magnesium, zinc, cadmium, aluminum, gallium or indium, having a metal-to-carbon bond.

Aluminum compounds are preferred. Suitable are those having the formula $AlR_3$ and $RR'AlX$ wherein R is hydrocarbon, R' is selected from the group consisting of hydrogen and hydrocarbon, and X is selected from the group consisting of hydrogen, halogen, alkoxy, aryloxy, the residue of a secondary amine, amide, mercaptan, thiophenol, carboxylic acid and sulfonic acid. Compounds of formula $RAlX_2$ are best employed in combination with $RR'AlX$; compounds $R_3Al_2X_3$ are also suitable. Suitable cadmium and zinc compounds are those of formula $RR'Cd$ or $RR'Zn$ in which each R is a saturated hydrocarbon group of from 1 to 10 carbon atoms, e.g., an alkyl, cycloalkyl, aryl or alkaryl group. Usually R and R' are identical, but they may be different if desired. Zinc or cadmium diethyl and di-n-propyl are particularly preferred. R and R' may also be isopropyl, isobutyl, isoamyl, phenyl, tolyl, and the like.

Preferred for practical purposes are, among the aluminum alkyl compounds, trialkyls and dialkyl monohalides wherein the alkyl groups have from one to ten carbon atoms, zinc dialkyls having alkyl groups from one to ten carbon atoms, and mixtures thereof. Cadmium dialkyls are also of some practical interest. The preferred alkyl group in each type is the ethyl group, but compounds having n-propyl, isopropyl, n-butyl, isobutyl, n-octyl or 2-ethylhexyl groups, etc., may be employed. To produce catalysts which are highly stereospecific, aluminum dialkyl halides are preferred; aluminum diethyl chloride is most preferred. Instead of alkyl groups, suitable organometallic compounds may also have cycloalkyl, aryl, alkaryl or aralkyl groups.

The catalysts may be prepared by combining the ingredients in any desired order and contacting the combined ingredients with the monomer to be polymerized. In a batch or semi-batch method the catalyst ingredients are placed into a suitable hydrocarbon diluent in the reactor and monomer feed is then introduced. Additional catalyst components may be added during the course of the reaction. In continuous processes catalyst ingredients may be fed separately or in combination to the reactor as required during the course of the process.

POLYMERIZATION METHODS AND CONDITIONS

Polymerizations according to this invention and recovery of polymer are suitably carried out according to methods known to be suitable for low-pressure olefin polymerization processes of the prior art. This includes batchwise, semi-batchwise or continuous operations under conditions that exclude air and other atmospheric impurities, particularly moisture.

The reaction temperature is maintained between 0° and 150° C. Temperatures between 40° and 70° C. are generally preferred.

The reaction pressure is not critical. It is usually only sufficiently high to maintain liquid phase reaction conditions; it may be autogenic pressure, which will vary depending upon the components of the reaction mixture and the temperature, or it may be higher, e.g., up to 1000 p.s.i. High pressures are suitably obtained by pressuring with monomer gas or with an inert gas.

In batch operations the polymerization time can be varied as desired; it may vary, for example, from a few minutes to several hours. Polymerization in batch processes may be terminated when monomer is no longer absorbed, or earlier, if desired, e.g., if the reaction mixture becomes too viscous. In continuous operations the polymerization mixture passes through a reactor of any suitable design. The polymerization reactions in such cases are suitably adjusted by varying the residence time. Residence times vary with the type of reactor system and range, for example, from 10 to 15 minutes to 2 or more hours.

In a suitable continuous operation, fresh feed, diluent and catalyst are continuously introduced into an agitated reaction zone and reaction mixture is withdrawn from the zone for removal and recovery of polymer. Heat of reaction may be withdrawn by indirect heat exchange or by evaporation of diluent and/or monomer in the reaction zone.

After the polymerization is complete, polymer is recovered from a slurry or solution of the polymer in reaction diluent. A simple filtration may be adequate to separate polymer from diluent. Other means for separating polymer from diluent may be employed. The polymer may be treated, separately or while slurried in the reaction mixture, in order to separate catalyst residues. Such treatment may be with alcohols such as methanol, ethanol, or isopropanol, with acidified alcohols, or with other similar polar liquids. In many cases the polymers are obtained in hydrocarbon solutions and the polymer can be recovered by coagulation with acidified alcohol, e.g., rapidly stirred methanol or isopropanol containing 2% w. hydrochloric acid. Following this initial coagulation the polymers are preferably washed several more times in methanol.

The concentration of monomer in the reaction mixture may vary upward from 5 percent by weight of the reaction mixture, depending on the conditions employed; the range from 20 to 80 percent by weight is preferred.

Catalysts are suitably used in a concentration ranging from about 0.1 to about 2% by weight based on the weight of the reaction mixture. The preferred molar ratios of organometallic reducing compound to transition metal halide or alkoxyhalide are in the range from 1:1 to 2:1 with well-tolerated polar compounds and may go as low as 0.5:1, while higher ratios, e.g., up to 30:1, are employed with less well-tolerated and poorly-tolerated ones. In general, the amount of organometallic reducing compound is sufficient to provide an excess of at least about 1 mole per mole of transition metal halide or alkoxide over the amount which is consumed in complexing with the polar olefin.

It is preferred to carry out the reactions according to this invention in a suitable diluent which is liquid under the conditions of reaction and relatively inert. The diluent may have the same number of carbon atoms per molecule as the olefin reactant or it may be in a different boiling range. Preferred as diluents are alkane and cycloalkane hydrocarbons. Suitable diluents are, for example, propane, butane, isobutane, cyclohexane, methylcyclohexane, Tetralin, Decalin, or saturated hydrocarbon mixtures in the gasoline boiling range or diesel oil boiling range. Aromatic hydrocarbons such as benzene, toluene, isopropylbenzene, xylene, or the like, or halogenated aromatic compounds such as chlorobenzene, or orthodichlorobenzene and the like may also be employed, if desired.

ILLUSTRATIVE EXAMPLES

The following examples are representative of this invention but are not to be considered as limiting it.

Unless otherwise indicated, parts and percentages are by weight.

Unless otherwise indicated, the transition metal component of the catalyst is a composition prepared by admixing titanium trichloride and aluminum triethyl in a hydrocarbon solvent in 3:1 molar ratio at ambient temperature, followed by heating at a temperature of 160° to 170° C. for about one-half hour. The composition contains $TiCl_3$ in its active gamma form.

Unless otherwise stated, the experiments are carried out as follows: Reaction mixture, including solvent, monomers and catalyst, is prepared in a pressure resistant glass bottle in the absence of air and moisture. The bottle is closed and agitated in a controlled temperature bath for the desired period. At the end of the period, acidified isopropanol is added to deactivate the catalyst, unless otherwise stated. The product is then precipitated and washed free of acid with methanol. Studies may then be carried out on the polymer.

EXAMPLE 1

Representative experimental results of homopolymerizations of polar organic compounds are reported in tabular form in Table 1.

TABLE 1.—HOMOPOLYMERIZATION OF POLAR OLEFINS

| Run No. | Polar olefin | Catalyst, mmoles | | | Solvent,[a] ml. | Polymerization conditions | | Polymer yield, percent wt. | Elemental analysis, percent wt. | | I.V., dl/g. | Polymer appearance |
|---|---|---|---|---|---|---|---|---|---|---|---|---|
| | | Mmoles | TiCl₃ | Metal alkyl | | Time, days | Temp., °C. | | Found | Theory | | |
| 1-1 | CH₂=CH(CH₂)₈N(n-C₄H₉)₂ | 25 | 0.5 | 4.0, Et₂AlCl | 60 C | 20 | 20 | 100 | 5.09 N | 4.98 N | (b) | Soft, sticky, white, translucent, rubbery. |
| 1-2 | CH₂=CH(CH₂)₂P(C₂H₅)₂ | 24 | 4.0 | {25, EtAlCl₂ / 24, Et₂AlCl} | 30 C | 7 | 50 | 74 | 9.8 P | 9.86 P | | Sticky, soft rubber.[h] |
| 1-3 | CH₂=CH(CH₂)₂OC₆H₅ | 50 | 0.5 | 2.0, Et₂AlCl | 60 H | 14 | 50 | 94 | 82.18 C, 9.54 H | 82.06 C, 9.53 H | .87 | Soft, white, horny solid. |
| 1-4 |  CH₂=CH—CH₂—⌬—OCH₃ | 50 | 1.0 | 8.0, Et₂AlCl | 60 C | 11 | 50 | 15 | 80.98 C, 8.24 H | 81.03 C, 8.16 H | (d) | White, crystalline powder. |
| 1-5 | CH₂=CH(CH₂)₈CO₂nC₄H₉ | 25 | 1.0 | {4.0 Et₂AlCl / 25, EtAtCl₂} | 60 H | 14 | 50 | 50 | 74.74 C, 11.71 H | 74.95 C, 11.74 H | (e) | Soft, cloudy, nearly colorless, tacky rubber. |
| 1-6 | [CH₂=CH(CH₂)₉O]₃Al | 10.7 | 1.0 | {4.0, Et₂AlCl / 32, EtAlCl₂} | 60 H | 14 | 50 | 11 | 76.91 C, 12.89 H | 77.58 C, 13.02 H | (f) | Slightly sticky, rubbery solid. |
| 1-7 | CH₂=CH(CH₂)₈CON(nC₄H₉)₂ | 25 | 1.0 | 30, Et₂AlCl₂ | 60 C | 20 | 20 | 96 | 4.69 N | 4.79 N | t.59 | Clear, colorless very viscous liquid. |
| 1-8 | CH₂=CH(CH₂)₈PO(OCH₃)₂ | 25 | 0.5 | 29, Et₂AlCl | 60 C | 7 | 50 | 15 | 8.2 P, 20.2 Ash | 11.81 P | | White powder which pressed to hazy, waxy film. |

[a] C=chlorobenzene; H=n-heptane.
[b] This polymer gives an insoluble gel in 150° C. Decalin. This polymer seems to have cross-linked on aging since it originally was soluble in many hydrocarbons.
[c] I.V. in o-dichlorobenzene at 150° C.
[d] The poly-4-allylanisole was only partially soluble in 100° C. toluene, 150° C. diphenyl ether and 170° C. n-decane, so no intrinsic viscosity was obtained.
[e] This polymer was not completely soluble in boiling xylene, 150° C. Tetralin or diphenylether, or 230° C. o-dichlorobenzene.
[f] This polymer was not completely soluble in boiling xylene, 160° C. Tetralin or diphenylether, or in 250° C. ethylene glycol.
[g] I.V. in toluene at 50° C. Polymer fractionated during work-up. I.V. determined on major fraction.
[h] Polymer contained 0.32% Cl, presumably due to some HCl addition product.

The following remarks elaborate on the results of some of Runs 1-1 through 1-8.

Run 1-1: Poly(N,N-di-n-butyl-10-undecenamine)

The best yields of this polymer are obtained when it is prepared with an excess of aluminum alkyl over the polar organic monomer. When the reaction mixture contains a polar organic solvent such as chlorobenzene as major diluent, the polymer product remains in solution in the reaction mixture. In the presence of a predominantly non-polar diluent such as n-heptane, the polymer precipitates from the reaction mixture as an insoluble gum.

This polymer, as many other representative polymers of polar organic olefins, has quite different properties from the corresponding hydrocarbon polymer and poses different problems in work-up and purification. The poly(N,N-di-n-butyl-10-undecenamine) obtained directly from the polymerization is recovered in the form of a complex. Catalyst residues are removed from the latter by acidic washing; when hydrochloric acid is used the resulting polymer is present as the amine hydrochloride. Poly(N,N - di - n - butyl - 10 - undecenamine)hydrochloride has solubility chracteristics quite different from the free amine polymer. The amine hydrochloride polymer is more soluble in polar solvents such as chloroform and isopropanol and less soluble in non-polar solvents such as toluene and n-heptane than the free-amine polymer. The free-amine polymer can be obtained from the polymer hydrochloride by treatment with a strongly basic compound, for example, triethylamine or aqueous sodium hydroxide.

The polymer of Run 1-1 is a soft, white, sticky, translucent rubber. It has approximately the theoretical nitrogen content but contains some chlorine, presumably as hydrochloride. When freshly prepared the polymer is soluble in aromatic hydrocarbons and acetic acid. The polymer has the characteristic of self-curing, gradually forming cross-links so that after standing at ambient temperature in air for a few weeks the polymer becomes insoluble.

Run 1-3: Poly(7-phenoxy-1-heptene)

These polymers are produced in high yield with Ziegler catalysts of standard proportions suitable for alpha-monoolefin hydrocarbon polymerization. The polymers are soft, white horny solids which can be pressed to free films which have birefringent melting points in the 68–70° C. range. The polymers are hydrocarbon soluble when produced, and become partially hydrocarbon insoluble as they age. The polymers are suitable intermediates for conversion to sulfonated and nitrated polymers.

Run 1-4: Poly(4-allylanisole)

Poly(4-allylanisole) prepared according to Run 1-4 is a white powder which can be pressed to clear colorless brittle films which have birefringent melting points near 240° C. The polymer melts recrystallize readily on cooling. An X-ray powder photograph of the polymer shows it to be crystalline. The polymer is incompletely soluble in boiling toluene or n-decane but is soluble in 150° C. diphenyl ether.

Run 1-5: Poly(n-butyl-10-undecenoate)

Esters with terminal olefinic unsaturation can be polymerized with Ziegler catalysts only in the presence of sufficient aluminum alkyl to complex the ester.

In polymerization reactions carried out in chlorobenzene solvent, the polymer remains in solution, while in the presence of n-heptane diluent the polymer precipitates. After acid washing, the polymers formed in n-heptane are partially insoluble in toluene or methyl ethyl ketone, but the polymers formed in chlorobenzene are soluble in toluene. The insoluble polymers are soft, white, solids and the predominantly soluble polymers soft, nearly colorless, cloudy, tacky, rubbers. The polymers have the expected infrared spectra for a long-chain polyester, with carbonyl absorption near 5.9μ and polymethylene absorptions at 13.7 and 13.9μ.

Run 1–6: Poly(10-undecen-1-ol)

This alcohol was polymerized as the aluminum tris(10-undecenoxide) complexed with aluminum alkyl. With aluminum diethyl chloride the polymer is produced as a white horny solid with low carbon-hydrogen ratio. With a predominantly ethyl aluminum dichloride co-catalyst, a softer, more elastic, slightly sticky polymer having close to the theoretical elemental analysis is produced. All the polymers can be pressed to flexible films. The polymer films pressed from the horny solid polymers are moderately birefringent at room temperature and all give birefringent melting points in the 121° to 124° C. range. The polymer melts are clear and colorless and recrystallize readily on cooling. The film from the softer rubbery polymer has only slight birefringence, which is lost at about 55° C. The polymer recrystallizes by brief cooling to below room temperature. The polymers are all partly soluble at 150° in diphenyl ether or dimethylsulfolane.

Run 1–7: Poly(N,N-di-n-butyl-10-undecenamide)

Monomers containing the amide group require complexing with more than an equivalent of aluminum alkyl to maintain catalytic polymerization activity. Good polymer yields are obtained when sufficient complexing aluminum alkyl is present. The complexed polymer precipitate as it forms as a clear gum both in the presence of heptane and of colorobenzene diluent. After work-up the polymers are clear, nearly colorless, very viscous liquids which are soluble in a wide range of solvents including isopropanol, ether and toluene. The polymers can be fractionated from ether-pentane mixtures by cooling to −80° C. The polyamides formed in runs such as 1–7 are of high molecular weight, as indicated by the intrinsic viscosity. The nitrogen analyses and infra-red spectra of the polymers are satisfactory for the expected polyamides.

Run 1–8: Poly(dimethyl-10-undecenylphosphonate)

This ester was polymerized in chlorobenzene in the presence of more than an equivalent amount of aluminum alkyl. The polymers form as insoluble precipitates. The polymers present a work-up problem, in that it is difficult to remove catalyst metal residue without hydrolysis of the polymer. Washing the polymers with anhydrous methanol leaves a relatively high ash content and a phosphorus content less than theory. A polymer with about 20% by weight ash, on pressing, formed a very hard, brittle, clear, colorless film, while one with 11.5% by weight ash pressed to colorless, translucent, waxy, flexible films at 200° C. The brittle and flexible films were birefringent at room temperature, but on heating up to 260° C., the films decomposed without appreciable liquefaction. The polymers are insoluble in the tested organic solvents, such as hot diphenyl ether or Tetralin.

EXAMPLE 2

Representative experimental results of random copolymerizations of alpha-monoolefinic hydrocarbons and polar organic compounds are reported in tabular form in Table 2. The polymerizations were conducted in the manner described in Example 1.

TABLE 2.—RANDOM COPOLYMERIZATION OF ALKENES AND POLAR OLEFINS

| Run No. | Compound | G. | Mmoles | Catalyst, mmoles TiCl₃ | Catalyst, mmoles Metal alkyl | n-Heptane, ml. | Time, days | Temp., °C | Polymer yield, percent wt. | Elemental analysis, percent wt. | Polar olefin in copolymer,[a] percent wt. | I.V.,[b] dl./g. | Polymer appearance |
|---|---|---|---|---|---|---|---|---|---|---|---|---|---|
| 2-0 | 1-hexene | 19.9 | | 0.5 | 2.0, Et₂AlCl | 120 | 7 | 50 | 83 | | | 2.1 | |
| 2-1 | 1-hexene / CH₂=CH(CH₂)₈N(H)(C₆H₅) | 20.1 / 12.0 | | 0.5 | 2.0, Et₂AlCl / 6.0, EtAlCl₂ | 120 | 7 | 50 | 78 | 0.506 N | 8.9 | 1.8 | Sticky gum. |
| 2-2 | 1-hexene / (CH₂=CH(CH₂)₉N(H)(C₆H₅) | 20.0 / 12.0 | | 0.5 | 2.0, Et₂AlCl / 12, EtAlCl₂ | 120 | 7 | 50 | 38 | 0.718 N | 12.6 | | Do. |
| 2-3 | 1-hexene / (CH₂=CH(CH₂)₉N(C₂H₅)₂ | 20.0 / 12.0 | | 0.5 | 2.0, Et₂AlCl / 6.0, EtAlCl₂ | 120 | 7 | 50 | 54 | 0.716 N | 9.9 | 1.3 | Do. |
| 2-4 | 1-hexene / 1-hexene / CH₂=CH(CH₂)₉N(C₂H₅)₂ | 20.0 / 6.0 | | 0.5 | 2.0, Et₂AlCl / 6.0, EtAlCl₂ | 120 | 7 | 50 | 63 | 0.275 N | 4.4 | | Do. |
| 2-5 | 1-hexene / CH₂=CH(CH₂)₈N(C₆H₅)₂ | 100.4 | | 2.0 | 50, Et₂AlCl | 600 | 7 | 50 | 81 | 0.52 N | 12.4 | 1.7 | Do. |
| 2-6 | 1-dodecene / CH₂=CH(CH₂)₈PC₆H₅ | 12.5 / 9.1 | | 4.0 | 16, Et₂AlCl | 60 | 7 | 50 | 89 | 0.51 Cl, 3.7 P | | d.1.4 | Soft, horny solid. |
| 2-7 | 1-hexene / CH₂=CH(CH₂)₈CO₂CH₃ | 20.0 / 6.0 | | 0.5 | 2.0, Et₂AlCl / 6.0, EtAlCl₂ | 120 | 7 | 50 | 52 | 0.9 O | 5.6 | | Sticky, viscous liquid. |
| 2-8 | 1-hexene / CH₂=CH(CH₂)₈CO₂CH₃ | 20.0 / 12.0 | | 0.5 | 2.0, Et₂AlCl / 12, EtAlCl₂ | 120 | 7 | 50 | 50 | 1.4 O | 8.7 | 1.1 | Do. |
| 2-9 | 1-hexene / (CH₂=CH(CH₂)₈CO₂)₃Al | 106.7 | | 2.0 | 60, Et₂AlCl | 600 | 7 | 50 | 83 | 2.2 O, 9.1 p.p.m. Al | 12.6 | 2.2 | Soft sticky gum. |
| 2-10 | 1-hexene / CH₂=CH(CH₂)₈CON(C₂H₅)₂ | 20.0 / 6.0 | | 0.5 | 2.0, Et₂AlCl / 6.0, EtAlCl₂ | 120 | 7 | 50 | 62 | 0.267 N | 6.4 | | Sticky, viscous liquid. |
| 2-11 | 1-hexene / CH₂=CH(CH₂)₈CON(C₄H₉)₂ | 20.0 / 12.0 | | 0.5 | 2.0, Et₂AlCl / 12, EtAlCl₂ | 120 | 7 | 150 | 40 | 0.433 N | 10.4 | 1.1 | Do. |

See footnotes at end of table.

TABLE 2.—Continued

| Run No. | Compound | Catalyst, mmoles | | | n-Heptane, ml. | Polymerization conditions | | Polymer yield, percent wt. | Polymer properties | | | |
|---|---|---|---|---|---|---|---|---|---|---|---|---|
| | | G. Mmoles | TiCl₃ | Metal alkyl | | Time, days | Temp, °C. | | Elemental analysis, percent wt. | Polar olefin in copolymer,ᵃ percent wt. | I.V.,ᵇ dl./g. | Polymer appearance |
| 2-12 | {1-dodecene<br>{CH₂=CH(CH₂)₉PO(OCH₃)₂ | 23.1<br>12.0 | 0.5 | 14, Et₂AlCl | ᶜ60 | 7 | 50 | 78 | 0.66 P | 5.5 | | Tough, horny solid. Insoluble in aromatic HC. |
| 2-13 | {4-methyl-1-pentene<br>{CH₂=CH(CH₂)₃N(C₆H₅)(CH₃) | 20.0<br>6 | 0.5 | 2.0, Et₂AlCl | 60 | 7 | 50 | 91 | 0.052 Nᶠ | ᶠ0.65 | | Moldable powder. Forms relatively clear molded films. |
| 2-14 | {4-methyl-1-pentene<br>{CH₂=CH(CH₂)₃N(C₆H₅)(CH₃) | 20.0<br>24 | 0.5 | 2.0, Et₂AlCl | 60 | 7 | 50 | 23 | 0.24 Nᶠ | 3.0 | .7.1 | Do. |
| 2-15 | {4-methyl-1-pentene<br>{CH₂=CH(CH₂)₃N(CH₂C₆H₅)₂ | 20.0<br>6 | 0.5 | 2.0, Et₂AlCl | 60 | 7 | 50 | 93 | 0.244 Nᶠ | ᶠ5.8 | | Do. |
| 2-15a | {4-methyl-1-pentene<br>{CH₂=CH(CH₂)₈N(CH₂C₆H₅)₂ | 20.1<br>12 | 0.5 | 2.0, Et₂AlCl | 60 | 7 | 50 | 50 | 0.302 Nᶠ | ᶠ7.2 | ᶠ6.7 | Do. |
| 2-16 | {4-methyl-1-pentene<br>{4-allylanisole | 19.9<br>12 | 0.5 | 2.0, Et₂AlCl | 60 | 7 | 50 | 19 | 0.50 Oxᶠ | ᶠ4.6 | ᶠ6.4 | Moldable powder. |
| 2-17 | {4-methyl-1-pentene<br>{CH₂=CH(CH₂)₅OC₆H₅ | 20<br>24 | 0.5 | 2.0, Et₂AlCl | 60 | 7 | 50 | 100 | 2.20 Oxᶠ | ᶠ26 | | Do. |
| 2-18 | {4-methyl-1-pentene<br>{CH₂=CH(CH₂)₈CO₂CH₃ | 19.8<br>2 | 0.5 | 2.0, Et₂AlCl | 60 | 7 | 20 | 20 | 0.65 Oxᶠ | ᶠ4.4 Ex. | ᶠ6.8 | Moldable powder molds to relatively pliable film. |
| 2-19 | {4-methyl-1-pentene<br>{[CH₂=CH(CH₂)₈CO₂]₃Al | 39.7<br>10 | 4 | {12, Et₂AlCl<br>{10, Et₂AlCl₂ | 120 | 7 | 50 | 66 | | 5.3 | ᶠ2.7 | Clear, colorless film. Shows anhydride as well as acid carbonyl. |
| 2-20 | {4-methyl-1-pentene<br>{CH₂=CH(CH₂)₈CON(C₆H₅)₂ | 20.0<br>1 | 0.5 | 2.0, Et₂AlCl | 60 | 7 | 50 | 100 | 0.075 Nᶠ | ᶠ1.8 | | |
| 2-21 | {4-methyl-1-pentene<br>{CH₂=CH(CH₂)₈CON(C₆H₅)₂ | 19.0<br>6 | 0.5 | {2, Et₂AlCl<br>{6, Et₂AlCl₂ | 60 | 7 | 50 | ᵍ19 | 1.34 Nᶠ | ᵍ34.5 | 2.3 | Polymer could be pressed to form transparent flexible films. |
| 2-22 | {1-hexene<br>{CH₂=CH(CH₂)₈N(C₂H₅)₂ | 101.8<br>48.0 | 2.0 | 51, Et₂AlCl | 600 | 7 | 50 | 91 | 0.42 N | 6.8 | 3.1 | Sticky gum. |
| 2-23 | {1-dodecene<br>{CH₂=CH(CH₂)₈CON(n-C₄H₉)₂ | 135.0<br>30.0 | 5.0 | {45, Et₂AlCl<br>{20, Et₂Zn | 600 | 3<br>4 | 50<br>75 | 36 | 0.03 N | 0.6 | .19 | Waxy, white solid. |
| 2-24 | {1-dodecene<br>{CH₂=CH(CH₂)₄N(C₆H₅)₂ | 20.0<br>20 | 0.75 | 2, Et₃Al | 60 | 5 | 60 | 90 | | | | |
| 2-25 | {1-eicosene<br>{CH₂=CH(CH₂)₈PS(C₆H₅)₂ | 20<br>6 | 0.5 | 8, Et₂AlCl | 60 | 5 | 50 | 60 | | | | |

ᵃ Polar olefin contents calculated from elemental analyses.
ᵇ I.V. in Decalin at 150° C. unless otherwise stated.
ᶜ Solvent is chlorobenzene.
ᵈ I.V. in toluene at 25° C.
ᵉ Run made with 260 ml. hydrogen. Polar olefin content of polymer calculated as the free acid, using oxygen determined by difference. Since workup yielded both acid and anhydride, the reported value is conservative.
ᶠ Determined on residue from extraction with boiling isooctane.
ᵍ Yield low due to catalyst poison in feed.

The following remarks elaborate on the results of some of Runs 2–1 through 2–25. Run 2–0 is a control run made with an alpha-olefin as sole monomer.

Copolymers of unsaturated amines (Runs 2–1 to 2–5, 2–13 to 2–15a, 2–22 and 2–24): In Runs 2–1 through 2–5, 1-hexene is copolymerized with N-phenyl-10-undecenamine, N,N-di-ethyl-10-undecenamine and N,N-dibenzyl-9-decenamine, each in the presence of excess aluminum alkyl. Copolymers containing 4.4 to 12.6% wt. amine are obtained in 42 to 91% yields. These copolymers are soft tacky rubbers or gums. The free amine rubbers are hydrocarbon soluble, but the amine hydrochloride rubbers are essentially insoluble in hydrocarbons. It may be noted that the aluminum alkyl complexes of these copolymers also appear to be hydrocarbon soluble. In the form of salts, these copolymers can be dispersed in polar solvents, including water. Runs 2–22 and 2–24 are qualitatively similar to the above.

Runs 2–13 to 2–15a are copolymerizations of olefinic amines with 4-methyl-1-pentene. These copolymers are examples of film- and fiber-forming materials containing polar groups. The presence of these latter groups will facilitate printing and dyeing.

Copolymers of phosphines: The polymeric phosphine from Run 2–6 is qualitatively similar to the amine copolymers. This particular phosphine was designed to be a polymeric ligand with various special metal ions.

Copolymers of unsaturated esters and amides (Runs 2–7, 2–8, 2–10, 2–11, 2–18, 2–20, 2–21 and 2–23): In Runs 2–7 and 2–8 and Runs 2–10 and 2–11, respectively, equimolar amounts of methyl-10-undecenoate or N,N-di-phenyl-10-undecenamide and of aluminum alkyl are copolymerized with 1-hexene. Copolymers containing 5.6 and 8.7% weight ester of 6.4 and 10.4% weight amide are obtained in average yields of about 50%. These copolymers are hydrocarbon soluble, sticky, viscous liquids. The copolymers prepared in Runs 2–18, 2–20 and 2–21 (as well as Runs 2–16 and 2–17 containing ether groups) represent potential film- or fiber-forming polymers containing polar groups to facilitate printing and dyeing. The product of Run 2-23 is a waxy solid melting in the 40-50° C. range and is soluble in hot hydrocarbons and many other solvents.

Copolymers of unsaturated phosphonate esters (Run 2-12): The copolymerization of 1-decene with aluminum alkyl-complexed dimethyl-10-undecenylphosphonate resulted in a 78% yield of copolymer containing 5.5% weight of the phosphonate ester. The copolymer is originally hydrocarbon soluble, but heating apparently causes it to cross-link and become insoluble. For example, the copolymer ceased to flow properly on repeated film pressing at 100° C. and became insoluble in Decalin at 150° C. These copolymers are white, horny solids which can be pressed to colorless translucent films at 100° C.

Copolymers of 10-undecenoic acid (Runs 2-9 and 2-19): This acid was polymerized as aluminum tris(10-undecenoate) complexed with aluminum alkyl. The copolymers of 1-hexene and aluminum tris(10-undecenoate) are gels. On polymer work-up the aluminum soap is hydrolyzed, breaking down the cross-link structure and producing viscous n-heptane solutions of copolymer. By infrared spectra the copolymer after work-up is shown to contain free carboxylic acid groups as well as appreciable amounts of anhydride groups and sometimes traces of carboxylate anions. On long standing, the 10-undecenoic acid-1-hexene copolymers become moderately stiff gums which are no longer completely hydrocarbon soluble. This is probably due to progressive anhydride cross-linking. The 4-methyl-1-pentene copolymer is another example of a film- or fiber-forming material containing polar groups.

EXAMPLE 3

Block polymerizations of alpha-monoolefins and polar olefins were carried out as follows; the results and some of the conditions being listed in Table 3.

Into 600 ml. of n-heptane in a pressure vessel were introduced 5 millimoles of $TiCl_3$ prepared as described under the heading "Illustrative Examples," and 20 millimoles of diethyl aluminum monochloride cocatalyst. The mixture was stirred and maintained at 50°±3° C. Propylene was then continuously introduced at a rate sufficient to maintain a pressure of 5 p.s.i.g. After one hour, flow of propylene was discontinued and the polar monomer was added to the reaction mixture. In some cases further aluminum diethyl chloride was added at the same time as the polar monomer, in order to maintain polymerization conditions. The polymerization was continued for the times specified in Table 3.

extraction of the block copolymer removed about half of the amine present, indicating that part of the amine was firmly bound to the polypropylene. The homopolymer of N,N-di-n-butyl-10-decenamine is quite hydrocarbon soluble.

In the work-up of the block copolymer it was washed with hydrochloric acid to remove metal salts, which left pendent amine hydrochloride groups in the random copolymer portion of the molecules. These were subsequently reconverted to free amine groups by washing the polymer with diethyl amine. Chlorine analysis of the final polymer indicate that only about 3% of the amine groups remained as the hydrochloride.

Films pressed from the block copolymer are clear and colorless. The infrared spectra of these films show very weak polymethylene group absorption near 13.7 microns and 13.9 microns, due to n-butyl and —$(CH_2)_9$— groups, respectively.

Block copolymer of propylene with 7-phenoxy-1-heptene (Run 3-2): Since the phenoxy group has been found to be well tolerated by active Ziegler catalysts, only a minimum amount of extra aluminum alkyl is added with the 7-phenoxy-1-heptene used in the copolymerization step. The copolymerization step was run for 2 days, resulting in rather complete 7-phenoxy-1-heptene polymerization. During polymer work-up a moderate amount of soluble polymer was washed out. Separate extractions of the remaining block copolymer with isooctane and with toluene removed, respectively, about one-third and two-thirds of the poly-7-phenoxy-1-heptene. Homopolymer of 7-phenoxy-1-heptene is not completely soluble in heptene but does dissolve in cold toluene. Thus about one-third of the polymerized 7-phenoxy-1-heptene can be regarded as block polymerized onto polypropylene.

Films of the block copolymers were much clearer than comparable milled blends. Polymers and copolymers of phenoxyalkenes are particularly adapted to be converted to differing polar polymers and copolymers by secondary reactions of the phenoxy groups, such as sulfuration.

Block copolymer of propylene with di-methyl-10-undecenylphosphonate (Run 3-3): The phosphonate ester was introduced into the copolymerization step as the 1:1 molar complex with di-ethyl aluminum chloride. Isooctane extraction of the whole blocked copolymer removed only about 25% of the phosphorus originally present. Thus, the major proportion of the polymer of di-methyl-10-undecenylphosphonate, whether or not present as block copolymer, was not extracted by hydrocarbon. However, homopolymer of di-methyl-10-undecenylphosphonate is not very hydrocarbon solube and some homopolymer may have been present in the block

TABLE 3.—BLOCK CO-POLYMERIZATION OF PROPYLENE AND POLAR OLEFINS

| Run No. | Polar monomer | Mmoles | Cocatalyst added in second stage: metal alkyl, mmoles | Polymerization conditions Time, days | Polymerization conditions Temp., °C. | Polar olefin converted to unextractable polymer, percent wt. | I.V. in Decalin at 150° | Insoluble in isooctane, percent wt. | Polymer appearance |
|---|---|---|---|---|---|---|---|---|---|
| 3-1 | $CH_2=CH(CH_2)_9N(C_4H_9)_2$ | 20 | 20, $Et_2AlCl$ | 3 | 50±3 | 11 | 5.7 | 93.7 | Polymer pressed to clear, colorless films. |
| 3-2 | $CH_2=CH(CH_2)_5OC_6H_5$ | 30 | 3, $Et_2AlCl$ | 2 | 50±3 | 37 | 5.8 | 94.7 | Soft sticky solid when precipitated from benzene with methanol. Polymer pressed to clear, colorless film. |
| 3-3 | $CH_2=CH(CH_2)_8CO_2(C_4H_9)$ | 20 | 24, $EtAlCl_2$ | 3 | 50±3 | 17 | 6.1 | 94.8 | Do. |
| 3-4 | $CH_2=CH(CH_2)_8PO(OCH_3)_2$ | 30 | 30, $Et_2AlCl$ | 2 | 50±3 | 12 | 6.4 | 97.4 | Soft waxy solid. Could be pressed to colorless, slightly hazy films. |

The following remarks elaborate on the results of Runs 3-1 through 3-4.

Block copolymer of propylene and N,N-di-n-butyl-10-undecenamine (Run 3-1): This amine was added to the polymerization reactor as the 1:1 molar complex with di-ethyl aluminum monochloride. On polymer work-up, 84% of the input nitrogen was found in an oily residue washed out of the whole polymer and 11% of the input nitrogen was found in the block copolymer. Isooctane polymer. Films made from the whole copolymer were colorless and very faintly hazy. The infrared spectra of these films showed weak polymethylene chain absorption near 13.9 microns and increased absorption, compared to pure polypropylene in the 8 micron and 10 micron region, probably due to phosphorus oxygen bonds.

Block copolymer of propylene with n-butyl-10-undecenoate (Runs 3-4): Since esters inhibit Ziegler polymerization catalysts the n-butyl-10-undecenoate was added as a complex with aluminum alkyl halide. Isooctane extraction of the copolymer removed about one-third of the polymerized ester originally present, suggesting that at least part of the remainder is firmly bound to the polypropylene. Clear, colorless films could be pressed from this block copolymer.

EXAMPLE 4

One special property of many of the products produced according to this invention is their ability to impart desirable properties to lubricating oils. The fact that they are "ash-free" is a special advantage. The use of certain products of this invention in lubricating compositions is described in substantial detail in said copending application Ser. No. 371,105. The following illustrate this property.

The following non-ash compositions are representative.

Composition A: Percent wt.
   Example 2–22 copolymer ------------------ 1.5
   Mineral lubricating oil (SAE 20) _____ Balance
Composition B:
   Example 2–22 copolymer ------------------ 1.5
   Butylated polyphenylether (4 phenyl groups) _____ Balance
Composition C:
   Example 2–23 copolymer ------------------ 1.5
   Mineral lubricating oil (SAE 30) _____ Balance
Composition D:
   Example 2–22 copolymer ------------------ 1.8
   Bis(3,5-ditertiarybutyl-4-hydroxyphenyl) methane _____ 0.75
   Mineral lubricating oil (SAE 20W–30) ___ Balance
Composition E:
   Example 2–22 copolymer ------------------ 2
   Bis(3,5-ditertiarylbutyl-4-hydroxyphenyl) methane _____ 0.75
   Tricresylphosphate _____ 0.80
   Dicresylphosphate _____ 0.04
   Mineral lubricating oil (SAE 10W–30) __ Balance The above compositions are tested for their detergency and dispersancy properties by adding 0.02% carbon black to a test composition and suspending into said test oil at both ambient temperature and at 110° C. a strip of filter paper of set dimensions and observing the height and intensity of the carbon band formed on the filter paper. They exhibit at both temperatures detergency effectiveness of 2 to 3 times that of compositions containing $C_{4-20}$ alkyl methacrylate polymers such as Acryloid 150, 618 or 710, and specifically such compositions as:

Compositions W=mineral oil+2% "Acryloid 618" copolymer,
Compositions X=mineral oil+2% "Acryloid 150" copolymer,
Compositions Y=mineral oil+2% "Acryloid 710" copolymer,
Compositions Z=mineral oil+2% 2-methyl-5-vinylpyridine/lauryl methacrylate/stearyl methacrylate.

Also in engine tests such as the LS-3 Cadillac engine test modified as follows: 100 hours, 400 repeating cycles of 15 minutes each, comprising 1 minute at 90° F. jacket temperature, 10 minutes at 135° F. jacket temperature, 2500 r.p.m. and 4 minutes at 190° F. jacket temperature at 3200 r.p.m.; operated on high sulfur fuel, compositions A, C, D, and E pass the 100 hour test and prevent oil ring-plugging, leave oil rings clean and the engine in excellent condition, whereas compositions W, X, Y and Z fail within 50–75 hours, especially with respect to ring-plugging.

EXAMPLE 5

Copolymers of the present invention also can be used to form solid fuels by incorporating from 0.1% to 2% of a copolymer, such as a copolymer of Example 2–1 or a similarly prepared copolymer of hexene-1 and N-morpholine - 10 - undecenamide (MW=500,000) in a fuel such as a jet fuel to form a stable combustible gel.

Some copolymers of this invention can be modified by reacting them with sulfur, sulfur halides, phosphorus sulfides, e.g., $P_2S_5$, $PSCl_3$, $\varphi PSCl_2$, and $PCl_3$ or by sulfonating them in order to improve their load carrying and detergent properties. Thus, copolymers of Examples 2–5, 2–13, 2–20, 2–24 and 2–25, when reacted with $P_2S_5$ in the presence of catalytic amounts of $AlCl_3$ at between 200–400° F., form polythiophosphates which possess good load carrying properties. Sulfonation of the phenyl rings of these compounds and thereafter forming sulfonate salts, e.g., the Ca, Ba or Zn sulfonates of the above examples increases the detergent properties of these copolymers.

DEFINITIONS

In order to simplify the language of the claims herein, the term "a polar radical Z as defined in the specification" is defined as "a radical selected from the group consisting of: amino; cyano; phosphino; (hydrocarb)oxy; $-OM(R')_f$; $-OM(OR')_f$; $-O(M/g)$ and metal salts of M with a group $-CO_2H$, $-SO_3H$, and

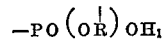

wherein M is selected from the group consisting of metals and metalloid atoms, $f+1=g=$the oxidation state of M, and R' is a hydrocarbon radical; carbonyl and their thio-analogs, carbo(hydrocarb)oxy and hydrocarbcarboxyloxy and their thio-analogs; hydrocarbyl sulfide; hydrocarbylpolysulfide; (hydrocarbyl)carbamyl and amido and their thio-analogs; phosphono; hydrocarbylsulfinyl and sulfonyl; and hydrocarbylsulfamyl."

The term "an inert group X as defined in the specification" is defined as "a group which is non-reactive under conditions of Ziegler polymerization and which separates the groups $CH_2=CH-$ and $-X$ which are attached to it by a distance at least equivalent to one carbon atom."

The term "saturated hydrocarbon group" refers to groups free of olefinic and acetylenic unsaturation, but includes aromatic groups, i.e., aryl, alkenyl and aralkyl groups.

We claim as our invention:
1. The method of polymerizing an omega-amino-1-alkene having from 5 to 20 carbon atoms in the alkenyl group, having at least two chain carbon atoms between the vinyl group and the amino group, and having at least one hydrocarbon substituent R on the amino nitrogen, where R is a member of the group consisting of alkenyl radicals of from 6 to 14 carbon atoms, to a linear polymer having a weight average molecular weight in the range from about 10,000 to one million, which comprises contacting a reaction mixture containing said omega-amino-1-alkene as sole polymerizable constituent, at a temperature in the range from 0° to 150° C. with a polymerization catalyst consisting essentially of titanium trichloride and at least one aluminum alkyl compound, the total concentration of aluminum alkyl compound being sufficient to provide an excess of at least about 1 mole, per mole of titanium trichloride, over the amount which is consumed in complexing with said omega-amino-1-alkene, continuing said contact until polymer of molecular weight in said range has been formed, and recovering said polymer from the reaction mixture.

2. The method according to laim 1 wherein said omega-amino-1-alkene is N,N-di-n-butyl-10-undecenamine and said reaction mixture comprises inert halogenated aromatic hydrocarbon and a catalyst consisting essentially of about 0.1 to 5.0 moles of titanium trichloride and about 60 to 120 moles of aluminum alkyl selected from the group consisting of aluminum diethyl chloride, aluminum ethyl dichloride, and mixtures thereof, per 100 moles of N,N-di-n-butyl-10-undecenamine.

3. Linear coordination-catalyzed homopolymers produced according to the process of claim 1 from omegaamino-1-alkenes having from 5 to 20 carbon atoms in the alkenyl group, having at least two chain carbon atoms between the vinyl group and the amino group, and having at least one hydrocarbon substituent R on the amino nitrogen, where R is a member of the group consisting of alkyl radicals of from 1 to 8 carbon atoms and aryl and alkaryl radicals of from 6 to 14 carbon atoms, said polymers having a weight average molecular weight in the range from about 10,000 to one million.

4. Linear homopolymer according to claim 3, wherein said omega-amino-1-alkene is N,N-di-n-butyl-10-undecenamine.

References Cited
UNITED STATES PATENTS

| | | | |
|---|---|---|---|
| 3,293,326 | 12/1966 | Jezl | 260—878 |
| 2,697,080 | 12/1954 | D'Alelio | 260—2.1 |
| 2,961,429 | 11/1960 | Anderson | 260—63 |
| 3,301,700 | 1/1967 | Maloney | 117—118 |
| 3,308,108 | 3/1967 | Feldhoff | 260—88.1 |
| 3,320,214 | 5/1967 | Pedersen | 260—66 |
| 3,040,012 | 6/1962 | Maeder | 260—89.7 |
| 3,308,104 | 3/1967 | Feldhoff | 260—79.7 |
| 3,022,172 | 3/1962 | Ohba | 96—114 |
| 3,043,821 | 7/1962 | Coover, Jr. | 260—89.5 |
| 3,057,833 | 10/1962 | Devlin | 260—82.1 |
| 3,070,577 | 12/1962 | Stogryn | 260—62 |
| 3,086,956 | 4/1963 | Armen | 260—45.5 |
| 3,092,563 | 6/1963 | Agius | 204—158 |
| 3,250,754 | 5/1966 | Stewart, Jr. | 260—80.8 |
| 3,282,904 | 11/1966 | Marktscheffel | 260—88.1 |
| 3,294,763 | 12/1966 | Hewett | 260—79.7 |
| 3,476,726 | 11/1969 | Giannini | 260—89.7 |
| 3,492,277 | 1/1970 | Clark | 260—88.1 |

FOREIGN PATENTS

| | | | |
|---|---|---|---|
| 604,163 | 8/1960 | Canada | 260—79.3 |

OTHER REFERENCES

Biswell, C. B. et al.: Indust. and Eng. News, vol. 47 (8), pp. 1598, 1599 (1955).

JOSEPH L. SCHOFER, Primary Examiner

C. A. HENDERSON, Jr., Assistant Examiner

U.S. Cl. X.R.

44—7, 62; 252—33, 33.6, 35, 41, 45, 46.6, 47.5, 48.2, 49.6, 50, 51.5 A, 52, 56 R; 260—47 UA, 63, 79.3 MU, 79.7, 80 P, 80 PS, 80 L, 80 P, 80.3 N, 85.5 M, 85.5 HC, 86.7, 87.3, 88.1 R, 88.1 PN, 88.1 PA, 88.1 PC, 88.1 PE, 88.3 R, 88.3 A, 88.7 C, 89.1, 89.3, 89.7 R, 91.1 R, 91.1 M, 91.1 A, 875, 878 B, 886, 885

UNITED STATES PATENT OFFICE
CERTIFICATE OF CORRECTION

Patent No. 3,761,458            Dated Sept. 25, 1973

Inventor(s) Howard V. Holler and Edward A. Youngman

It is certified that error appears in the above-identified patent and that said Letters Patent are hereby corrected as shown below:

In column 6, line 49, delete "poorly" (second occurance).

In column 6, line 60, after "groups" insert --fall into class NT and include di-n-butyl-borato--.

In column 20, line 41, delete "(Run 3-3)" and insert --(Run 3-4)--.

In column 20, line 51, delete "solube" and insert --soluble--.

In column 20, line 74, delete "(Runs 3-4)" and insert --(Run 3-3)--.

In column 22, line 41, delete "alkenyl" and insert --alkaryl--.

In column 22, line 49, delete "alkenyl" and insert --alkyl--.

Signed and sealed this 6th day of August 1974.

(SEAL)
Attest:

McCOY M. GIBSON, JR.           C. MARSHALL DANN
Attesting Officer              Commissioner of Patents